Figure 2:
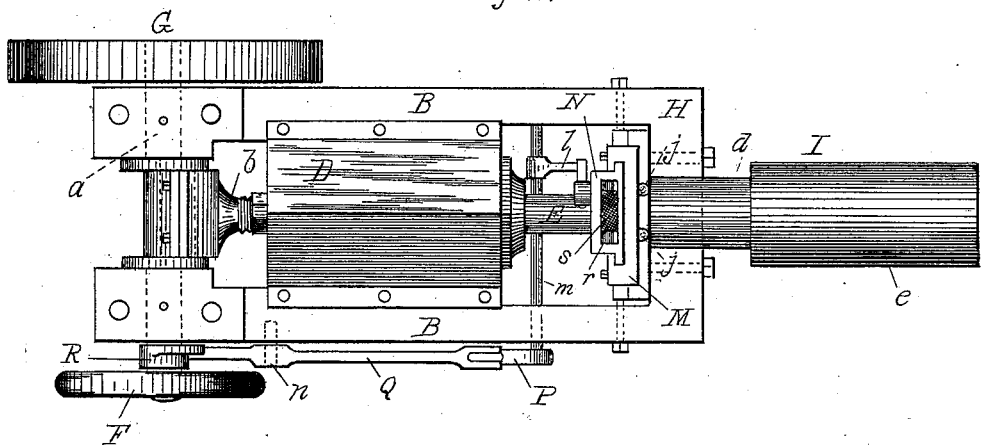

(No Model.) 2 Sheets—Sheet 1.

G. H. FOX & L. W. LOMBARD.
HEEL STIFFENER MACHINE.

No. 373,821. Patented Nov. 29, 1887.

Witnesses.
Joseph E. Watts
H. E. Lodge

Inventors.
George H. Fox.
and
Levi W. Lombard.
F. Curtis. Atty.

(No Model.) 2 Sheets—Sheet 2.

G. H. FOX & L. W. LOMBARD.
HEEL STIFFENER MACHINE.

No. 373,821. Patented Nov. 29, 1887.

on line x.x.

Witnesses.
Joseph E. Watt
H. E. Longe

Inventors.
George H. Fox
and
Levi W. Lombard.
F. Curtis. atty.

N. PETERS, Photo-Lithographer, Washington, D. C.

UNITED STATES PATENT OFFICE.

GEORGE H. FOX AND LEVI W. LOMBARD, OF BOSTON, MASSACHUSETTS;
SAID LOMBARD ASSIGNOR TO SAID FOX.

HEEL-STIFFENER MACHINE.

SPECIFICATION forming part of Letters Patent No. 373,821, dated November 29, 1887.

Application filed April 4, 1887. Serial No. 233,550. (No model.)

*To all whom it may concern:*

Be it known that we, GEORGE H. FOX and LEVI W. LOMBARD, citizens of the United States, residing at Boston, in the county of Suffolk and State of Massachusetts, have invented certain new and useful Improvements in Apparatus for the Manufacture of Boot or Shoe Stiffeners; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machinery for making boot or shoe stiffenings; and it consists in the general arrangement of the several instrumentalities which form the machine as an organized structure, and by means of which shoe-stiffeners—such as tips, heel-counters, or other similar articles—may be first molded and then cut at one and the same operation, in contradistinction to the various methods heretofore practiced, wherein the blanks are first cut and then subsequently molded.

Our improvements consist, primarily, of a reciprocating mold aligned and co-operating with a stationary but yielding former, between which is thrust and fed, by suitable mechanism, the leather-board from which the shoe-stiffenings are to be molded and cut, the contact of the reciprocating mold with the former first shaping the stiffening; secondly, in the combination, with a die, of the mold and former, which, holding the material firmly between their active faces, move bodily through the die and by such movement effect the cutting of the stiffener from the sheet of material in process; thirdly, of two spring-plates which co-operate with the former and mold, one of which plates guides the material into proper position to be molded and cut, and the other serves as a clearer to remove the finished stiffeners from the mold; fourthly, in the arrangement of mounting and adjusting the yielding former, by means of which its resistance to the reciprocating mold is regulated to suit stock of different thickness and strength; and, fifthly, in the general mechanical arrangement of the several component parts, by means of which said elements are relatively adjusted and operated with respect to each other. whereby shoe-stiffeners of varying shape and size and formed from material of different thickness can be made, being first molded and then cut, all of which will be fully hereinafter described.

Figure 1:
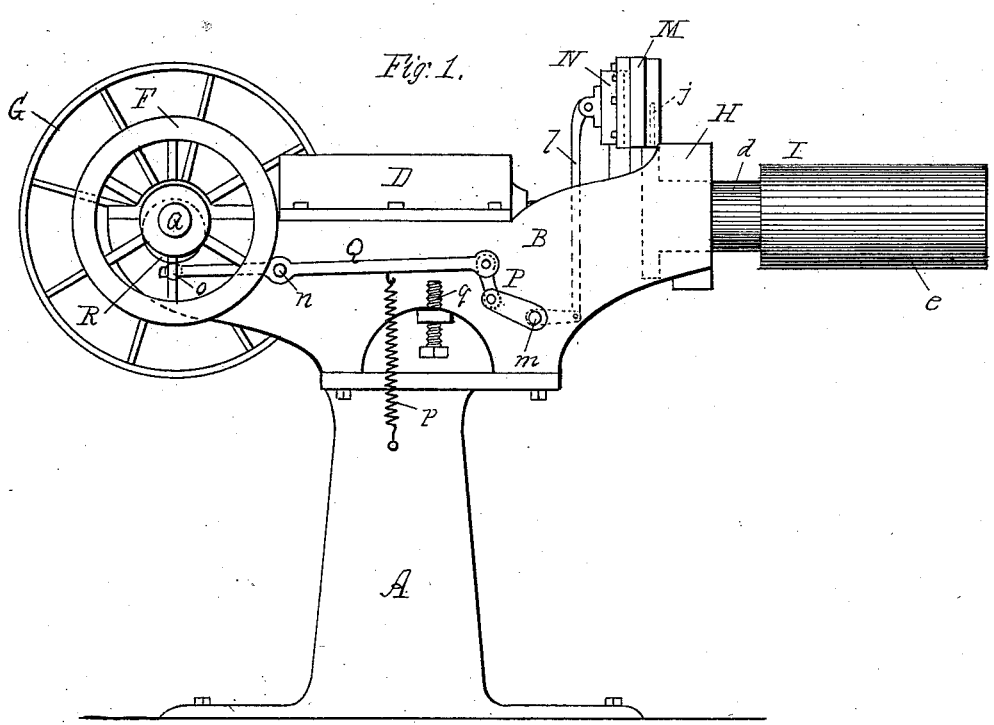
Figure 3:
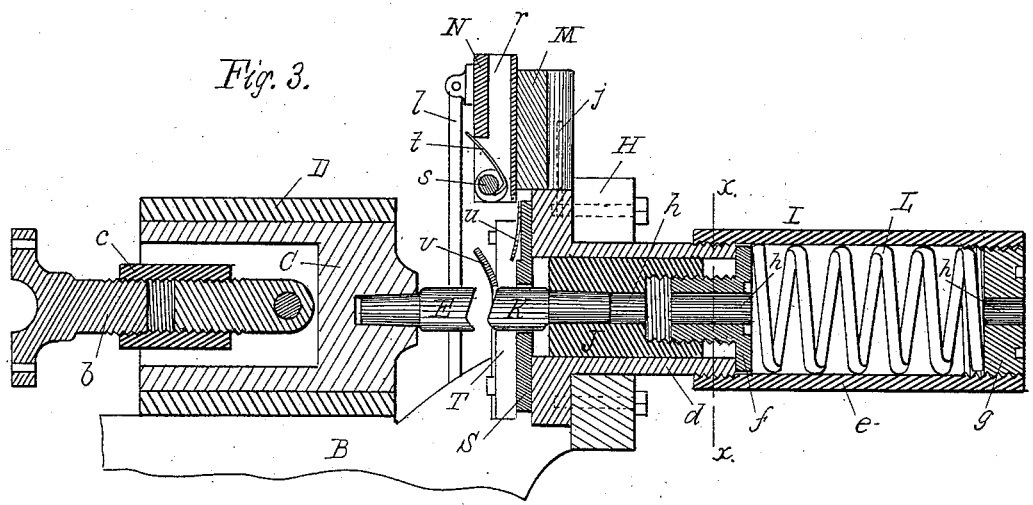
Figures 6, 7:
Figure 8:
Figure 5:
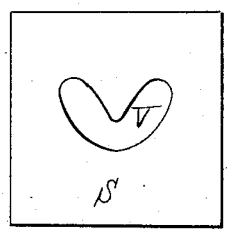
Figure 4:
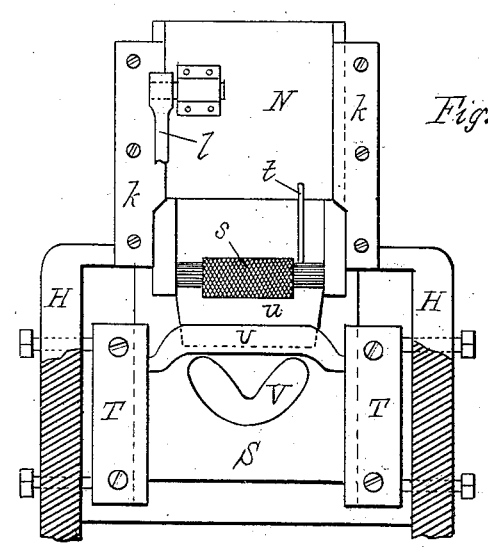

The drawings represent, in Figure 1, a side elevation, and Fig. 2 a plan, of a machine for making boot or shoe stiffeners embodying our invention. Fig. 3 is an enlarged central vertical section longitudinally of the upper part of the machine, which contains the former and mold. Fig. 4 is a front view of the feed mechanism and cutting-die. Fig. 5 is a transverse section on line *x x* in Fig. 3. Fig. 6 is a front view of the die-plate. Fig. 7 is a side elevation of the former, and Fig. 8 an end view of the mold, the former and mold being designed and shaped for the manufacture of shoe-tips.

In the above drawings, A represents a vertical post surmounted by a bed piece or standard, B, bolted thereto, and upon which are mounted and secured the various operating parts. Centrally or thereabout is located a tool-stock, C, which reciprocates within guides formed in the casting D, also bolted to the standard. Reciprocations of said tool-stock, which is centrally bored and armed at its front end with the removable mold E, are effected by means of the crank-shaft *a*, suitably mounted in bearings on the standard, and further provided with a balance-wheel, F, and driving-pulley G. Connection between the tool-stock C and shaft is had by means of a crank-rod, *b*, adjustable in length, as shown, by means of the screw-threaded sleeve *c*.

The extremity of the standard opposite that where the shaft *a* is located is provided with an upright head, H, to which is firmly bolted a tubular guide, I. This latter is composed of two pieces, *d e*, screwed together in the manner shown, the former of which contains a cylindrical block or carriage, J, centrally bored and armed with the former K, which is oppositely disposed but aligned with the mold E. The back end of said carriage is recessed and interiorly screw-threaded to admit an adjusting-nut, *f*, also centrally bored, said nut having a head, which abuts against the end of the piece *d* composing the guide I, and is adapted to receive the thrust from a heavy coiled spring, L, within the tubular piece *e*. The tension of this spring is regulated by the nut *g*, which closes the end of said piece. This nut is also centrally bored; hence a central opening, *h h h*, is obtained, by which access is had to extract and remove the former when different sizes are required, while the adjusting-nut *f* can be altered, and thus regulate the position of the former K by inserting an instrument to turn it, and so advance or retract the tool-carriage J by altering its length. The latter is prevented from rotating or shifting its position with respect to the mold by means of a spline-and-groove connection, *i*. (Shown in Fig. 5.)

The apparatus by which the leather-board is automatically fed consists of a casting, M, removably secured upon the head H by two posts, *j j*, which enter holes bored in said casting. Upon the front of this casting is positioned the feed-carriage N, which moves in guides formed by the plates *k k*, while its vertical intermittent reciprocations, which cause proper advance of the material, is effected by means of the connecting-rod *l*, affixed to a short rocker-arm on the transverse shaft *m*. The front end of the latter is united by a toggle-joint, P, to the lever-rod Q, which is pivoted at *n* to the bed-piece B. The short arm or tail end of the lever Q is provided with an anti-friction roll, *o*, which is wiped by a cam, R, upon the shaft *a*. A spring, *p*, serves to raise the feed-carriage N and return it to its normal or inactive position, while the downward active thrust of the cam and travel of the carriage is limited by an adjusting-screw, *q*.

By reference to Fig. 2 it will be seen that the feed-carriage is chambered at *r*, through which the material in process is entered, while, to compel the latter to advance with the carriage, a gripping-roll, *s*, is provided, eccentrically mounted and spring-actuated, at *t*. Furthermore, by reference to Fig. 3 two curved plates, *u v*, are shown. The rear one, *u*, is attached to a steel die, to be further explained, and curved outwardly, acting as a guide to direct the material between the former K and the mold E. The lower extremity of this spring-guide terminates behind and below the top edge of the clearer *v*. This latter is likewise curved, and thus a V-shaped passage is formed, into which the material is fed in process. The lower edge of this plate *v* is coincident with the top of the mold and serves the purpose of a clearer, when the latter retreats, to remove the finished stiffener away and permit it to drop into a proper receptacle.

Hitherto we have made no mention of the cutting process, which is a prominent feature in this machine; and to accomplish this result we have secured to the front or head of the tubular guide I a hardened steel die, S, constructed with an aperture, V, of the exact shape required for the shoe-tip or other similar article to be made. Through this aperture both the mold and former reciprocate for the following reason: After the material has been thrust by the feed mechanism between the operating-tools—the former and mold—the mold is advanced by the forward action of the stock C until it meets with the former K, which exerts an opposing pressure induced by the spring I, which is sufficient to properly and quickly shape the stiffener. Continuous advance movement of the stock C now compels the former K and mold E to travel as a unit, with the material tightly gripped between them, against the pressure of said spring, until the material meets the outer surface of the die S, which latter causes it to stop, when the sharp edge of the mold E, meeting with and passing into the aperture V, shears the material and carries with it the now completed shoe-tip, which is held between the two abutting faces of the mold and former. This die S is removably and adjustably held by the plates T T, which also grasp and support the clearer-plate *v*, the adjustment being both horizontal and vertical to align the aperture V correctly with the mold and former, in order to insure precision in the cut.

The operation of the various parts in the molding and cutting of boot or shoe stiffeners is as follows—and further presuming that the parts are in the positions relative to each other, as shown in Figs. 1, 2, and 3, with the material, in a continuous strip, inserted in the feed-carriage and in readiness to descend and convey the material between the tools: Upon rotation of the pulley G and shaft *a*, the feed-carriage N descends and brings the material between the tools. The tool-stock C is advanced, and the mold E is forced against the yielding former K, when the material is grasped between their two active faces, while the spring L resists sufficiently to properly mold the stiffener. The crank-shaft *a* continues to advance the former and mold, which now act as a unit, the former K retreating on its sliding carriage J, and the mold E advancing, until their meeting surfaces, or the joint formed thereby, arrive at the mouth of the aperture V in the die S, when the material contacts against the face of the die and the tools pass through the aperture, the sharp end of the mold E thrusting the material before it and cutting out the shoe-tip or other stiffener, which is carried along between the tools. Further rotation of the shaft *a* and pulley G now permits the mold E to retreat, while the former K advances, actuated by the spring L. The travel of the carriage J is limited and controlled by the head of the nut *f*, which abuts against the inner end of the tubular piece *d*. As the mold E continues to retreat, it separates from the former K, which is now stationary, while the clearer *v* wipes along the upper portion of the mold and strikes the stiffener, just made, which is knocked into a proper receptacle. Simultaneously with the grasping of the material between the active faces of the former and mold, the cam R (see Fig. 1)

retreats from the roller o, and permits the spring p to pull the lever Q down, and, by aid of the interconnecting parts, raise the feed-carriage N, the roughened gripping-roll s slipping on the material, which cannot move, being held between the tools. The position of the cam R upon the shaft a is such that it engages and depresses the tail end of the lever Q prior to the advance movement of the tool-stock C and mold E; hence the feed-carriage N is actively operated, and the material in process is fed downward and interposed between the tools before their active parts meet. Furthermore, during the interval, when the material is grasped by the former K and mold E, the feed-carriage retreats, and is then in readiness to again advance the material prior to a second active movement of the reciprocating mold.

We claim—

1. The method of manufacturing boot or shoe stiffeners, which consists in the following steps: first, in presenting by proper feed mechanism the material from which said articles are made in a continuous blank strip or series of strips to forming-tools; secondly, in molding such stiffeners while in the blank sheet by said tools, and, thirdly, in punching or cutting the articles thus molded from the strip all in one continuous operation, substantially as herein specified.

2. In machinery for making boot or shoe stiffeners, the combination, with a fixed apertured die, S, adjustably mounted, of two tools, in cross section, substantially the same shape as said aperture, axially aligned and co-operating with said die, one stationary but yielding, and the other reciprocating with respect to it, said tools adapted to first mold and then cut the stiffener from the blank material, substantially as herein stated.

3. The combination, with the fixed tubular guide, the spring-actuated tool-carriage provided with a former, and the die having the aperture within which is transversely located said former, of the mold affixed to a tool-stock and adapted to reciprocate with respect to the former, substantially as and for purposes described.

4. In mechanism for producing boot or shoe stiffeners, the reciprocating mold, its actuating mechanism, and the stationary but yielding former which co-operates therewith, in combination with the cutting-die and the feed-carriage adapted to intermittently advance the material in front of the yielding former and die, substantially as set forth.

5. The combination, with the tool-stock C, its molding-tool E, actuating-shaft a, and the feed-carriage N, operated as set forth, of the former K, the apertured die S, and the tubular guide I, which contains the carriage J, adjustable in length, whereby the former K is positioned with respect to the die, as and for purposes herein set forth.

6. In machinery for producing boot or shoe stiffeners, the combination, with a yielding carriage, J, adjustable in length by the nut $f$ and furnished with the former K, of the molding-tool E, the tubular guide I, having the spring L, which supports the carriage in the act of molding a stiffener, and the fixed die S, for cutting the same, substantially as stated.

7. In combination with the tubular guide I and the adjusting-nut $g$, centrally bored, the spring L, yielding carriage J, and the headed nut $f$, both pierced at $h\,h$, to permit removal of the former, as herein set forth.

8. The combination, with standard A, bed-piece B, the stationary but yielding former K, and the reciprocating mold E, of the removable casting M, the feed-carriage N, with its roll s, and the clearer v, co-operating with the plate u, to direct the material between the tools, substantially as and for purposes herein described.

9. The bed-piece B, its head H, to which is secured the tubular guide I, furnished with the former K, the removable piece M, having the sliding carriage N, channeled at r, and with the eccentric spring-actuated gripping-roll s, in combination with the clearer v, coincident with the mold, and the mold adapted to travel contiguous to the same and co-operate with the former K, as and for purposes herein specified.

10. In combination with the bed-piece B, head H, and the feed-carriage N, with its operating-rod l, the actuating shaft a, cam R, and the interconnecting lever Q, toggle P, and shaft m, by which the feed-carriage is caused to advance the material prior to the act of molding the stiffener, substantially as stated.

11. In combination with the bed-piece B, head H, and the feed-carriage N, with spring-roll s and operating-rod l, the interconnecting shaft m, toggle P, and tilting lever Q, provided with the spring p and adjusting-screw q, whereby the feed-carriage is caused to retreat in the act of molding a stiffener and its travel is limited, as herein described.

12. In machinery for producing boot or shoe stiffeners, the combination, with a yielding former, K, located within an apertured die transversely thereof, and the co-operating feed-carriage N, of the tool-stock C and its mold E, reciprocated by and adjustably connected with the shaft a by the crank-rod b, substantially as set forth.

In testimony whereof we affix our signatures in presence of two witnesses.

GEORGE H. FOX.
LEVI W. LOMBARD.

Witnesses:
H. E. LODGE,
F. CURTIS.